US012160839B2

(12) United States Patent
Tang

(10) Patent No.: US 12,160,839 B2
(45) Date of Patent: Dec. 3, 2024

(54) METHOD AND SYSTEM FOR SYNCHRONIZING DATA ON REMOTE CONTROLS BASED ON A BROADCAST FROM UNMANNED AERIAL VEHICLE

(71) Applicant: AUTEL ROBOTICS CO., LTD., Guangdong (CN)

(72) Inventor: Pengcheng Tang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 397 days.

(21) Appl. No.: 17/661,354

(22) Filed: Apr. 29, 2022

(65) Prior Publication Data

US 2022/0264496 A1 Aug. 18, 2022

Related U.S. Application Data

(63) Continuation of application No. PCT/CN2020/124050, filed on Oct. 27, 2020.

(30) Foreign Application Priority Data

Oct. 30, 2019 (CN) .......................... 201911048146.2

(51) Int. Cl.
*H04W 56/00* (2009.01)
(52) U.S. Cl.
CPC ................................ *H04W 56/001* (2013.01)
(58) Field of Classification Search
CPC ..... H04W 56/001; H04W 56/00; H04W 4/06; H04W 56/0005; H04W 56/0015;
(Continued)

(56) References Cited

U.S. PATENT DOCUMENTS

2011/0222515 A1* 9/2011 Wang et al. .................. 370/338
2016/0124459 A1* 5/2016 Armbruster et al. ..... G06F 1/10
(Continued)

FOREIGN PATENT DOCUMENTS

CN 105261189 A 1/2016
CN 106100721 A 11/2016
(Continued)

OTHER PUBLICATIONS

Li et al. (CN 109842508 A) >>> Multi-terminal Cooperative Work Method Terminal Device and Cooperative Control of Multi-terminal System (see title) (Year: 2019).*

(Continued)

*Primary Examiner* — Meless N Zewdu

(57) ABSTRACT

The embodiments are a method and a system for synchronizing data. The method includes: sending, by any remote control in at least two remote controls, a configuration message to an unmanned aerial vehicle, the configuration message carrying current configuration information of the any remote control; broadcasting, by the unmanned aerial vehicle, the received configuration message; and synchronously updating, by the at least two remote controls, current configuration information of the at least two remote controls according to the received broadcast configuration message. Therefore, in a scenario in which a plurality of remote controls interact with an unmanned aerial vehicle, information synchronization among the plurality of remote controls may be implemented in a simple communication manner without adding a hardware module.

18 Claims, 1 Drawing Sheet

(58) Field of Classification Search
CPC .......... H04W 56/002; H04W 56/0025; H04W 56/0065; H04W 4/46; H04W 4/30; H04W 4/38; G05D 1/0022; G05D 1/00

See application file for complete search history.

(56) References Cited

U.S. PATENT DOCUMENTS

| | | | | |
|---|---|---|---|---|
| 2016/0313734 | A1* | 10/2016 | Enke | G05D 1/0088 |
| 2017/0309088 | A1* | 10/2017 | Arya et al. | G07C 5/085 |
| 2017/0357273 | A1* | 12/2017 | Michini et al. | G05D 1/101 |
| 2017/0364071 | A1 | 12/2017 | Fu et al. | |
| 2018/0120829 | A1* | 5/2018 | Price | G05D 1/0016 |
| 2019/0020433 | A1* | 1/2019 | Pitigoi-Aron | H04J 3/0685 |

FOREIGN PATENT DOCUMENTS

| | | | | |
|---|---|---|---|---|
| CN | 106406349 | A | 2/2017 | |
| CN | 107101342 | A | 8/2017 | |
| CN | 107438801 | A | 12/2017 | |
| CN | 107454947 | A | 12/2017 | |
| CN | 104821841 | B | * 12/2018 | G08C 17/02 |
| CN | 109445464 | A | 3/2019 | |
| CN | 110753313 | A | 2/2020 | |
| WO | 2015200209 | A1 | 12/2015 | |

OTHER PUBLICATIONS

Udo, et al. (WO 2019098190 A1) >>> Communication Device, Slave Device, Communication System, and Program (see title) (Year: 2019).*

Jeffrey et al (KR 20180053687 A) >>> Synchronize Multiple Devices on a Device (see title) (Year: 2018).*

Kitayama et al. (WO 2011058625 A1) >>> Communication System, Communication Apparatus and Time Synchronization Method (see title) (Year: 2011).*

Zhou et al. (WO 2018119720 A1) >>> Unmanned Aerial Vehicle System (see title) (Year: 2018).*

Tao et al. (CN 108780603 A) >>> An Unmanned Aerial Vehicle System and Communication Method Thereof, and Remote Control Device (see title) (Year: 2018).*

Ma et al. (111295331 A) >>> System and Method for Making a Plurality of Control Device and the Synchronization of Mobile Object (see title) (Year: 2020).*

Shen, Wei (CN 107071794 A) >>> Uav Network (see title) (Year: 2017).*

Tao et al. (CN 102955456 A) >>> Minitype Unmanned Aerial Vehicle Control System Based on Bus Communication (see title) (Year: 2013).*

Wu et al. (CN 108387866 A) >>> An Unmanned Aerial Vehicle Based on Reinforcement Learning of Finding Illegal Broadcast Station Method (see title) (Year: 2018).*

Yang et al. (CN 108445909 A) >>> Unmanned Aerial Vehicle Control System (see title) (Year: 2018).*

Wenchao et al. (CN 104821841 B) >>> A Ground Station Communication Device and Pairing Method Thereof (see title) (Year: 2018).*

Zhu et al. (WO 2020063239 A1) >>> Method and Device for Supervising Unmanned Aerial Vehicle (see title) (Year: 2020).*

PCT International Search Report mailed Jan. 27, 2021; PCT/CN2020/124050 with English Translation.

* cited by examiner

METHOD AND SYSTEM FOR SYNCHRONIZING DATA ON REMOTE CONTROLS BASED ON A BROADCAST FROM UNMANNED AERIAL VEHICLE

CROSS-REFERENCE TO RELATED APPLICATIONS

The present application is a continuation of International Application No. PCT/CN2020/124050, filed on Oct. 27, 2020, which claims priority to Chinese patent application No. 201911048146.2, filed on Oct. 30, 2019, which is incorporated herein by reference in its entirety.

TECHNICAL FIELD

Embodiments of the present invention relate to wireless communication technologies, and in particular, to a method and a system for synchronizing data.

BACKGROUND

In the field of unmanned aerial vehicles, one-to-one communication between an unmanned aerial vehicle and a remote control is generally implemented by configuring one remote control for one unmanned aerial vehicle, to ensure the consistency between states of the unmanned aerial vehicle and the remote control. If the unmanned aerial vehicle is controlled in a master-slave remote control manner by adding one remote control, the control of the unmanned aerial vehicle needs to be synchronized from one remote control to another remote control.

Solutions adopted in the related art are roughly divided into two types: One is to establish a direct communication channel between two remote controls to implement information synchronization between the two remote controls. The other is to use an unmanned aerial vehicle as an intermediate node, to route communication for the two remote controls.

However, adopting the first type of solution requires a wireless connection between the two remote controls. In this case a hardware part needs to be added to the remote control. An implementation process of adopting the second type of solution is relatively complex.

SUMMARY

The present invention provides a method and a system for synchronizing data, to implement, in a scenario in which a plurality of remote controls interact with an unmanned aerial vehicle, information synchronization among the plurality of remote controls in a simple communication manner without adding a hardware module.

According to a first aspect, the embodiments of the present invention provide a method for synchronizing data, including:
  sending, by any remote control in at least two remote controls, a configuration message to an unmanned aerial vehicle, the configuration message carrying current configuration information of the any remote control;
  broadcasting, by the unmanned aerial vehicle, the received configuration message; and
  synchronously updating, by the at least two remote controls, current configuration information of the at least two remote controls according to the received broadcast configuration message.

According to second aspect, the embodiments of the present invention further provide a system for synchronizing data. The system includes at least two remote controls and an unmanned aerial vehicle.

Any remote control in the at least two remote controls is configured to send a configuration message to an unmanned aerial vehicle, the configuration message carrying current configuration information of the any remote control.

The unmanned aerial vehicle is configured to broadcast the received configuration message.

The any remote control is further configured to synchronously update the current configuration information of the any remote control according to the received broadcast configuration message.

The embodiments of the present invention provide a method and a system for synchronizing data. Specifically, any remote control in at least two remote controls sends a configuration message to an unmanned aerial vehicle. The configuration message carries current configuration information of the any remote control. The unmanned aerial vehicle broadcasts the received configuration message. The at least two remote controls synchronously update current configuration information of the at least two remote controls according to the received broadcast configuration message. Therefore, in a scenario in which a plurality of remote controls interact with an unmanned aerial vehicle, information synchronization among the plurality of remote controls may be implemented in a simple communication manner without adding a hardware module.

DETAILED DESCRIPTION

The following further describes the present invention in detail with reference to the accompanying drawings and embodiments. It may be understood that specific embodiments described herein are only intended to explain the present invention, rather than limit the present invention. In addition, it should be further noted that, for ease of description, the accompanying drawings show only parts related to the present invention rather than the entire structure.

In addition, in the embodiments of the present application, the word, such as "optionally" or "exemplarily", is used to represent giving an example, an illustration, or a description. Any embodiment or design scheme described as an "optionally" or "exemplarily" in the embodiments of the present invention should not be explained as being more preferred or having more advantages than another embodiment or design scheme. Exactly, use of the word, "optionally", "exemplarily", or the like, is intended to present a related concept in a specific manner.

Embodiment 1

Figure 1:
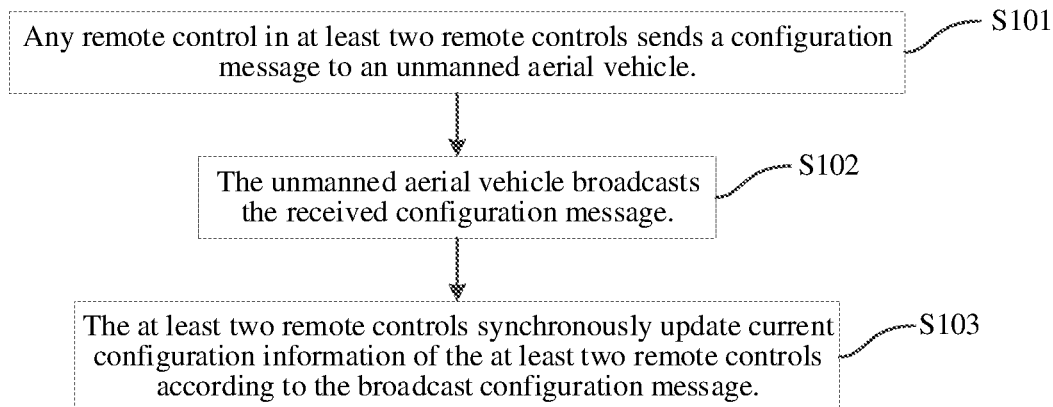
FIG. 1 is a flowchart of a method for synchronizing data according to Embodiment 1 of the present invention.

An embodiment of the present invention provides a method for synchronizing data, applicable to a scenario in which an unmanned aerial vehicle interacts with a plurality of remote controls. A specific procedure is shown in FIG. 1, including the following steps:

S101. Any remote control in at least two remote controls sends a configuration message to an unmanned aerial vehicle.

In this embodiment, there are at least two remote controls. Any remote control in the at least two remote controls may wirelessly communicate with the unmanned aerial vehicle. An aerial camera may be arranged on the unmanned aerial vehicle.

Exemplarily, any remote control may send a configuration message to the unmanned aerial vehicle. The configuration message carries current configuration information of the any remote control.

The configuration information may be understood as control information for setting the aerial camera on a configuration page of the any remote control, for example, the resolution of the aerial camera, a storage path of a shooting file, or activation and deactivation of the aerial camera.

S102. The unmanned aerial vehicle broadcasts the received configuration message.

After receiving the configuration message sent by the remote control, the unmanned aerial vehicle may broadcast the received configuration message within a communication coverage range of the unmanned aerial vehicle, so that all remote controls within the communication coverage range of the unmanned aerial vehicle may receive the configuration message broadcast by the unmanned aerial vehicle.

S103. The at least two remote controls synchronously update current configuration information of the at least two remote controls according to the received broadcast configuration message.

Any remote control in the at least two remote controls may wirelessly communicate with the unmanned aerial vehicle. That is, all remote controls in the at least two remote controls are within the coverage range of the unmanned aerial vehicle. Therefore, all the remote controls in the at least two remote controls can receive the configuration message broadcast by the unmanned aerial vehicle. Further, current configuration information of all the remote controls may be updated according to the configuration information carried in the configuration message.

For example, it is assumed that there are two remote controls, namely, a remote control a and a remote control b, and both the remote control a and the remote control b are within the coverage range of the unmanned aerial vehicle and can wirelessly communicate with the unmanned aerial vehicle. If the remote control a send a configuration message carrying configuration information of the remote control a to the unmanned aerial vehicle, the unmanned aerial vehicle may broadcast the received configuration message within the coverage range of the unmanned aerial vehicle. In this way, the remote control b may also receive the configuration message broadcast by the unmanned aerial vehicle, and further, update current configuration information of the remote control b according to the configuration information carried in the configuration message. Configuration information can be synchronized between the remote control a and the remote control b by using this method.

This embodiment of the present invention provides a method for synchronizing data. Specifically, any remote control in at least two remote controls sends a configuration message to an unmanned aerial vehicle. The configuration message carries current configuration information of the any remote control. The unmanned aerial vehicle broadcasts the received configuration message. The at least two remote controls synchronously update current configuration information of the at least two remote controls according to the received broadcast configuration message. Therefore, in a scenario in which a plurality of remote controls interact with an unmanned aerial vehicle, information synchronization among the plurality of remote controls may be implemented in a simple communication manner without adding a hardware module.

Embodiment 2

Figure 2:
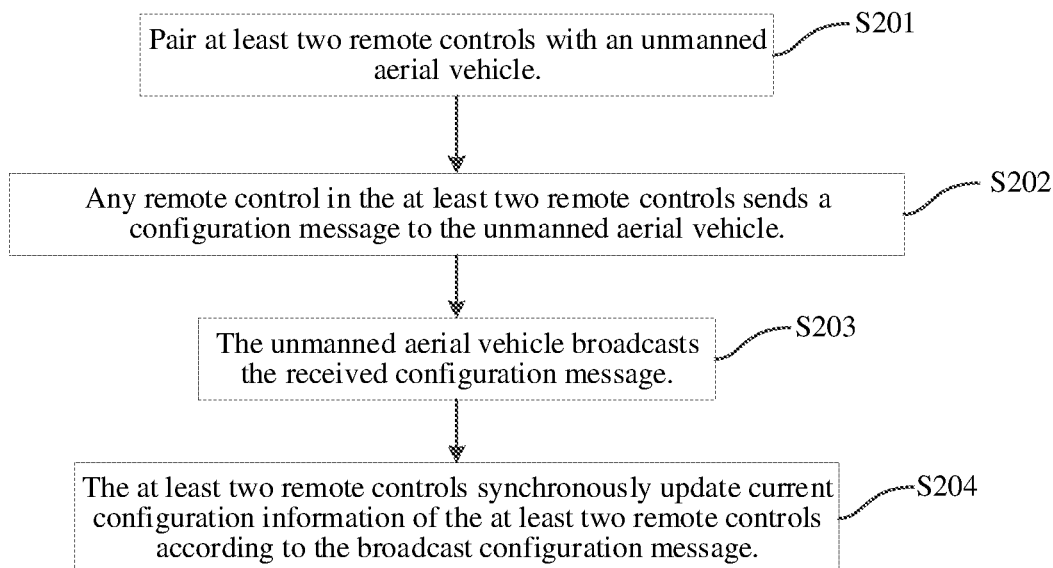
FIG. 2 is a flowchart of a method for synchronizing data according to Embodiment 2 of the present invention.

An embodiment of the present invention provides a method for synchronizing data. As shown in FIG. 2, the method is further optimized based on the method shown in FIG. 1. The method includes the following steps:

S201. Pair at least two remote controls with an unmanned aerial vehicle. This embodiment is applicable to a scenario in which a plurality of remote controls interact with an unmanned aerial vehicle. Before the remote controls interact with the unmanned aerial vehicle, the remote controls need to be paired with the unmanned aerial vehicle. In this embodiment, there are at least two remote controls. Therefore, the at least two remote controls need to be paired with the unmanned aerial vehicle.

Exemplarily, the at least two remote controls may communicate with a wireless communication module on the unmanned aerial vehicle by using wireless communication modules of the at least two remote controls to establish pairing relationships.

For example, it is assumed that there are three remote controls a, b and c. The three remote controls may be paired with the unmanned aerial vehicle by sending verification codes or other verification messages to the wireless communication module on the unmanned aerial vehicle by using the wireless communication modules of the three remote controls, to establish communication connections between the remote controls and the unmanned aerial vehicle, thereby ensuring that all the three remote controls can receive the message sent by the unmanned aerial vehicle.

Further, in this embodiment, an aerial camera may be arranged on the unmanned aerial vehicle.

S202. Any remote control in the at least two remote controls sends a configuration message to an unmanned aerial vehicle.

After the at least two remote controls are successfully paired with the unmanned aerial vehicle, normal communication connections may be performed. Any remote control may send a configuration message to the unmanned aerial vehicle. The configuration message carries current configuration information of the remote control sending the configuration message and a device identification of the remote control.

The configuration information may be understood as control information for setting the aerial camera on a configuration page of the any remote control, for example, the resolution of the aerial camera, a storage path of a shooting file, or activation and deactivation of the aerial camera.

As in step S201, it is assumed that there are three remote controls a, b and c. The remote control a sends a configuration message to the unmanned aerial vehicle. The configuration message carries current configuration information and a device identification of the remote control a.

S203. The unmanned aerial vehicle broadcasts the received configuration message.

After receiving the configuration message sent by the remote control, the unmanned aerial vehicle may broadcast the received configuration message within a communication coverage range of the unmanned aerial vehicle. In this way, all remote controls within the communication coverage range of the unmanned aerial vehicle can receive the configuration message broadcast by the unmanned aerial vehicle.

In this embodiment, the remote controls a, b and c are all successfully paired with the unmanned aerial vehicle and can perform normal communication, indicating that the remote controls a, b and c are all within the communication coverage range of the unmanned aerial vehicle. Therefore, the remote controls a, b and c all can receive the configuration message broadcast by the unmanned aerial vehicle.

S204. The at least two remote controls synchronously update current configuration information of the at least two remote controls according to the received broadcast configuration message.

All remote controls in the at least two remote controls can receive the configuration message broadcast by the unmanned aerial vehicle. Therefore, all the remote controls in the at least two remote controls all can update current configuration information of all the remote controls according to the configuration information carried in the configuration message.

Optionally, this embodiment provides an implementation in which at least two remote controls synchronously update current configuration information of the at least two remote controls according to the received broadcast configuration message. The implementation is determining, by each of at least two remote controls according to the received broadcast configuration message, whether the received broadcast configuration message is a message sent by the at least two remote controls, and synchronously update the current configuration information of the at least two remote controls according to a determination result.

The determination result in the foregoing implementation is divided into two cases. One is that the configuration message broadcast by the unmanned aerial vehicle is sent by a specific remote control in the at least two remote controls. The other is that the configuration message broadcast by the unmanned aerial vehicle is not sent by a specific remote control in the at least two remote controls.

Exemplarily, the foregoing determining manner may be performing determining by performing comparison on a device identification of a remote control sender carried in the configuration message.

For the first case, when the configuration message broadcast by the unmanned aerial vehicle is sent by any remote control in the at least two remote controls, after receiving the broadcast configuration message, the any remote control ignores the configuration message and maintains current configuration information of the any remote control unchanged.

For the second case, when the configuration message broadcast by the unmanned aerial vehicle is not sent by any remote control in the at least two remote controls, after receiving the broadcast configuration message, the any remote control synchronously updates current configuration information of the any remote control according to the configuration information carried in the configuration message.

Further, the remote control may update, by using an application layer of the remote control, current configuration information of the remote control to the configuration information carried in the configuration message.

Exemplarily, it is assumed that in the foregoing three remote controls, the remote control a sends a configuration message carrying configuration information and a device identification of the remote control a to the unmanned aerial vehicle. The configuration information is resolution, for example, m*n, currently set by the remote control a for the aerial camera on the unmanned aerial vehicle. After receiving the configuration message, the unmanned aerial vehicle may broadcast the configuration message within the communication coverage range of the unmanned aerial vehicle. In this way, the remote controls a, b and c that establish connections with the unmanned aerial vehicle all can receive the configuration message broadcast by the unmanned aerial vehicle.

For the remote control a, if the remote control a determines, by comparing the device identification of the remote control a with the device identification carried in the received broadcast configuration message, that the configuration message is sent by the remote control a, the remote control a ignores the configuration message and maintains current configuration information of the remote control a unchanged.

For the remote controls b and c, if the remote controls b and c determine, by comparing the device identifications of the remote controls b and c with the device identification carried in the received broadcast configuration message, that the configuration message is not sent by the remote control b or c, the remote controls b and c may synchronously update current configuration information of the remote controls b and c according to the configuration information carried in the configuration message.

For example, after receiving the configuration message broadcast by the unmanned aerial vehicle, the wireless communication modules of the remote controls b and c may transfer the configuration information in the configuration message to application layers of the remote controls b and c by using the TCP/IP protocol stack, and update the current configuration information of the remote controls b and c to the configuration information carried in the configuration message based on the application layers. Assuming that the resolution currently set by the remote controls b and c for the aerial camera on the unmanned aerial vehicle is k*l, the remote controls b and c may update the current resolution of the remote controls b and c to the resolution m*n carried in the configuration message.

In this way, configuration information may be synchronized among a plurality of remote controls (for example, the remote controls a, b and c) interacting with an unmanned aerial vehicle.

This embodiment of the present invention provides a method for synchronizing data. Specifically, any remote control in at least two remote controls sends a configuration message to an unmanned aerial vehicle. The configuration message carries current configuration information of the any remote control. The unmanned aerial vehicle broadcasts the received configuration message. The at least two remote controls synchronously update current configuration information of the at least two remote controls according to the received broadcast configuration message. Therefore, in a scenario in which a plurality of remote controls interact with an unmanned aerial vehicle, information synchronization among the plurality of remote controls may be implemented in a simple communication manner without adding a hardware module.

Embodiment 3

Figure 3:
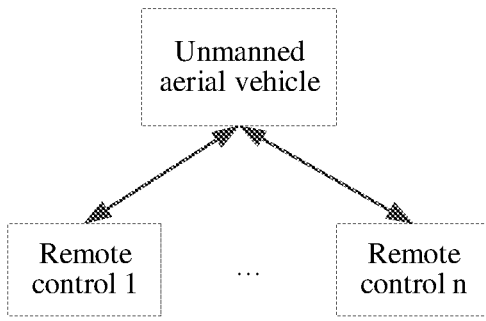
FIG. 3 is a schematic structural diagram of a system for synchronizing data according to Embodiment 3 of the present invention.

An embodiment of the present invention provides a system for synchronizing data, applicable to a scenario in which an unmanned aerial vehicle interacts with a plurality of remote controls. As shown in FIG. 3, the system includes at least two remote controls and an unmanned aerial vehicle Any remote control in the at least two remote controls is configured to send a configuration message to an unmanned aerial vehicle. The configuration message carries current configuration information of the any remote control.

The unmanned aerial vehicle is configured to broadcast the received configuration message.

The any remote control is further configured to synchronously update the current configuration information of the any remote control according to the received broadcast configuration message.

Further, before the any remote control in the at least two remote controls sends the configuration message to the unmanned aerial vehicle, the at least two remote controls are further configured to be paired with the unmanned aerial vehicle.

Further, the pairing process may be pairing, by wireless communication modules of the at least two remote controls, the at least two remote controls with a wireless communication module of the unmanned aerial vehicle.

In this embodiment, any remote control in the at least two remote controls is further configured to determine, according to the received broadcast configuration message, whether the received broadcast configuration message is a message sent by the any remote control, and synchronously update the current configuration information of the any remote control according to a determination result.

Further, any remote control in the at least two remote controls is configured to maintain, in a case that the determination result is that the configuration message is a message sent by the any remote control, the current configuration information of the any remote control unchanged.

Alternatively, any remote control in the at least two remote controls is configured to synchronously update, in a case that the determination result is that the configuration message is not a message sent by the any remote control, the current configuration information of the any remote control according to the configuration message.

Further, the any remote control in the at least two remote controls is further configured to update, by using an application layer of the any remote control, the current configuration information to the configuration information carried in the configuration message.

The system for synchronizing data provided in the embodiments of the present invention may execute the method for synchronizing data provided in Embodiments 1 and 2 of the present invention, and have corresponding functional modules and beneficial effects for executing the method.

Through the descriptions of the foregoing implementations, a person skilled in the art may clearly understand that the present invention may be implemented by software and necessary general hardware, and certainly, may also be implemented by hardware, but in many cases, the former manner is a better implementation. Based on such an understanding, the technical solutions of the present invention essentially, or the part contributing to the prior art may be implemented in the form of a software product. The computer software product may be stored in a computer-readable storage medium, such as a floppy disk, a read-only memory (ROM), a random access memory (RAM), a flash memory (FLASH), a hard disk, or an optical disc of a computer, and includes several instructions for instructing a computer device (which may be a personal computer, a server, a network device, or the like) to perform the methods described in the embodiments of the present invention.

It should be noted that the above are merely preferred embodiments of the present invention and applied technical principles. A person skilled in the art may understand that the present invention is not limited to the specific embodiments described herein, and various obvious changes, readjustments, and substitutions can be made by a person skilled in the art without departing from the protection scope of the present invention. Therefore, although the present invention is described in detail through the foregoing embodiments, the present invention is not limited to the foregoing embodiments, and may also include more other equivalent embodiments without departing from the concept of the present invention. The scope of the present invention is determined by that of the appended claims.

What is claimed is:

1. A method for synchronizing data, comprising:
   sending, by any remote control in at least two remote controls, a configuration message to an unmanned aerial vehicle, the configuration message carrying current configuration information of the any remote control;
   broadcasting, by the unmanned aerial vehicle, the received configuration message; and
   synchronously updating, by the at least two remote controls, current configuration information of the at least two remote controls according to the received broadcast configuration message.

2. The method according to claim 1, wherein before the sending, by any remote control in at least two remote controls, the configuration message to an unmanned aerial vehicle, the method further comprises:
   pairing the at least two remote controls with the unmanned aerial vehicle.

3. The method according to claim 2, wherein the pairing the at least two remote controls with the unmanned aerial vehicle comprises:
   pairing, by wireless communication modules of the at least two remote controls, the at least two remote controls with a wireless communication module of the unmanned aerial vehicle.

4. The method according to claim 1, wherein the synchronously updating, by the at least two remote controls, the current configuration information of the at least two remote controls according to the received broadcast configuration message comprises:
   determining, by the at least two remote controls according to the received broadcast configuration message, whether the received broadcast configuration message is a message sent by the at least two remote controls; and
   synchronously updating, by the at least two remote controls, the current configuration information of the at least two remote controls according to a determination result.

5. The method according to claim 4, wherein the synchronously updating, by the at least two remote controls, the current configuration information of the at least two remote controls according to a determination result comprises:
   maintaining, by any of the remote control in a case that the determination result is that the configuration message is a message sent by the any remote control in the at least two remote controls, the current configuration information of the any remote control unchanged.

6. The method according to claim 4, wherein the synchronously updating, by the at least two remote controls, the current configuration information of the at least two remote controls according to the determination result comprises:

synchronously updating, by any of the remote controls in a case that the determination result is that the configuration message is not a message sent by the any remote control in the at least two remote controls, the current configuration information of the any remote control according to the configuration message.

7. The method according to claim 6, wherein the synchronously updating, by the any remote control, the current configuration message of the any remote control according to the configuration information comprises:

updating, by the any remote control by using an application layer of the any remote control, the current configuration information to the configuration information carried in the configuration message.

8. A system for synchronizing data, comprising:

at least two remote controls and an unmanned aerial vehicle, any remote control in the at least two remote controls being configured to send a configuration message to the unmanned aerial vehicle, the configuration message carrying current configuration information of the any remote control, the unmanned aerial vehicle being configured to broadcast the received configuration message; and the any remote control being further configured to synchronously update the current configuration information of the any remote control according to the received broadcast configuration message.

9. The system according to claim 8, wherein the any remote control is further configured to determine, according to the received broadcast configuration message, whether the received broadcast configuration message is a message sent by the any remote control, and synchronously update the current configuration information of the any remote control according to a determination result.

10. The system according to claim 9, wherein the any remote control is configured to maintain, in a case that the determination result is that the configuration message is a message sent by the any remote control, the current configuration information of the any remote control unchanged.

11. The system according to claim 9, wherein the any remote control is configured to synchronously update, in a case that the determination result is that the configuration message is not a message sent by the any remote control, the current configuration information of the any remote control according to the configuration message.

12. A non-transitory computer readable memory medium storing program instructions executable by processing circuitry to cause a processor to:

send, by any remote control in at least two remote controls, a configuration message to an unmanned aerial vehicle, the configuration message carrying current configuration information of the any remote control;

broadcast, by the unmanned aerial vehicle, the received configuration message; and synchronously update, by the at least two remote controls, current configuration information of the at least two remote controls according to the received broadcast configuration message.

13. The non-transitory memory medium according to claim 12, wherein the program instructions are further executable to:

pair the at least two remote controls with the unmanned aerial vehicle.

14. The non-transitory memory medium according to claim 13, wherein the program instructions are further executable to:

pair, by wireless communication modules of the at least two remote controls, the at least two remote controls with a wireless communication module of the unmanned aerial vehicle.

15. The non-transitory memory medium according to claim 12, wherein the program instructions are further executable to:

determine, by the at least two remote controls according to the received broadcast configuration message, whether the received broadcast configuration message is a message sent by the at least two remote controls; and synchronously update, by the at least two remote controls, the current configuration information of the at least two remote controls according to a determination result.

16. The non-transitory memory medium according to claim 15, wherein the program instructions are further executable to:

maintain, by any of the remote controls in a case that the determination result is that the configuration message is a message sent by the any remote control in the at least two remote controls, the current configuration information of the any remote control unchanged.

17. The non-transitory memory medium according to claim 15, wherein the program instructions are further executable to:

synchronously update, by any of the remote control in a case that the determination result is that the configuration message is not a message sent by the any remote control in the at least two remote controls, the current configuration information of the any remote control according to the configuration message.

18. The non-transitory memory medium according to claim 17, wherein the program instructions are further executable to:

update, by the any remote control by using an application layer of the any remote control, the current configuration information to the configuration information carried in the configuration message.

* * * * *